United States Patent
Mangus

[11] 3,938,122
[45] Feb. 10, 1976

[54] GUIDANCE DEVICE

[76] Inventor: Jack E. Mangus, 456 Broadview Road, Tallmadge, Ohio 44278

[22] Filed: Nov. 15, 1974

[21] Appl. No.: 524,223

[52] U.S. Cl............... 340/275; 280/477; 340/52 R; 340/282
[51] Int. Cl.² .......................................... B62D 53/00
[58] Field of Search.......... 280/477; 340/52 R, 282, 340/275; 172/272

[56] References Cited
UNITED STATES PATENTS

| | | | |
|---|---|---|---|
| 3,646,438 | 2/1972 | Staff.................................. | 324/73 R |
| 3,731,274 | 5/1973 | Green............................. | 280/477 X |
| 3,734,539 | 5/1973 | Salmi................................. | 280/477 |

FOREIGN PATENTS OR APPLICATIONS

| | | | |
|---|---|---|---|
| 529,547 | 6/1955 | Italy................................... | 280/477 |

Primary Examiner—M. Henson Wood, Jr.
Assistant Examiner—John A. Pekar
Attorney, Agent, or Firm—Hamilton, Renner & Kenner

[57] ABSTRACT

Disclosed is a guidance device for the alignment of two separate objects at least one of which is movable with respect to the other such as, towing and towed vehicles, boats with a dock or trucks with loading docks. The device includes a flexible line connectible between desired points on the objects, such as the trailer hitch and the drawbar of the trailer, and means mounted on one of the objects for drawing in the line as the first object moves toward the second. A sensing means detects changes in the alignment of the two objects and an indicating means signals the changes to the operator whereby alignment may be determined and maintained. Additional indicating means may be provided to enable the operator to check the operability of various electrical components on board the vehicles.

6 Claims, 6 Drawing Figures

GUIDANCE DEVICE

BACKGROUND OF THE INVENTION

This invention relates to a guidance device which can be utilized in the alignment of two objects such as vehicles. More specifically, this invention relates to a device for aiding an individual operator in backing a towing vehicle into perfect alignment with a trailer for subsequent connection of the trailer to the vehicle. Additionally, the device may be provided with means to enable the operator to check various electrical systems of the towing vehicle and trailer such as lights and electrically operated brakes.

Generally, the problems accompanying the connection of a trailer to a vehicle arise when the weight of the trailer is such that the tongue of the trailer cannot be moved without great difficulty. This situation requires that the vehicle be backed into perfect alignment with the tongue of the trailer in order to make the connection by lowering the tongue of the trailer onto the ball of the vehicle hitch. Inasmuch as the driver of the vehicle cannot see the hitching device on the vehicle, it is very difficult, if not impossible, to back the vehicle into proper alignment to make the necessary connection.

This has resulted in the coordinating of the efforts of two persons to connect the vehicle to the trailer. One person backs the vehicle and the other person positions himself so that he can visually guide the vehicle operator into the proper alignment for connecting the trailer to the vehicle.

Many times, however, it is inconvenient to find the second person to perform the visual guiding and even then the driver and the guider may have considerable difficulty in coordinating their efforts and signals so as to effect proper alignment of the vehicle and the trailer. The second person is usually necessary also to indicate the operability of various electrical systems which are activated by the driver.

To overcome the difficulties of alignment, devices have long been sought which would enable the driver to make the connection without the assistance of another person. One of the first methods of accomplishing this was to mount a swivel wheel on the tongue of the trailer so that the vehicle may be backed to within some small distance of the trailer by approximating the position of the tongue relative to the ball of the hitch. Thereafter, the trailer tongue was moved over the ball for connection. This method was only effective so long as the tongue wheel rested upon a hard, smooth surface and the tongue weight was not too great. Unfortunately, the trailer tongue usually does not rest upon such a surface and therefore it is very difficult accurately to move the trailer tongue into place over the hitch ball.

Another prior art device utilizes a mirror or combination of flat and convex mirrors positioned above the tongue at a sufficient height to allow the driver visually to guide the vehicle into alignment with the tongue. When using two mirrors, the flat mirror is angled to provide visual contact at close range while the convex mirror is used to provide long range visual contact. This type of device has the disadvantage of often confusing the driver regarding the direction he must turn the steering wheel because of the reversed image in the mirror, thereby requiring considerable practice and skill to use the device effectively. Also, the image in the convex mirror is inherently small and distorted, further complicating its use. And, in darkness, it becomes difficult if not impossible to use such an arrangement.

Another device known in the prior art utilizes indicator sticks to translate the relative positions of the hitch ball and the tongue to the line of sight of the driver. A stick is attached to the tongue and plumbed so that the end of the stick is directly over the coupling assembly of the tongue. Another stick is attached to the vehicle and plumbed so its end is directly over the hitch ball. Thereafter, the vehicle may be backed into alignment by sighting the relation of the ends of the two sticks until they just meet. This device like the mirrors has the drawbacks of confusing the driver and being very difficult to use in darkness.

A device which has very limited usefulness employs steel plates mounted at 45° angles from the hitch ball, similar to the fifth wheel of a tractor, to guide the tongue into position over the ball. This device contemplates that the driver is capable of directing the ball to within a few inches either way of the tongue and that the tongue will give enough to affect alignment for subsequent connection of the trailer to the vehicle. This device has the obvious disadvantages of being of no use until the vehicle and the trailer are within relatively close relation to one another.

SUMMARY OF THE INVENTION

It is therefore an object of the present invention to provide a device for enabling the operator of a vehicle to back the vehicle into perfect alignment with a trailer tongue for connection therewith without the assistance of a second person.

It is a further object of the present invention to provide a device which can be used as readily in total darkness as in daylight.

It is another object of the present invention to provide a device which can be easily and quickly adapted for operation with any vehicle and trailer combination or any two objects which must be aligned, at least one of which is movable with respect to the other.

It is a still further object of the present invention to provide a device which is portable as to be capable of easy and quick set up for operation.

It is another object of the present invention to provide a device which can be employed to guide rearwardly a vehicle and trailer into a desired location such as a campsite.

It is yet another object of the present invention to provide a device which can be employed by the individual operator of a vehicle to ascertain the operability of various electrical systems of the vehicle and the trailer.

These and other objects of the present invention together with the advantages thereof over existing and prior art forms, which will become apparent from the description to follow, are accomplished by the improvements hereinafter described and claimed.

In general, a device employing the concepts of the present invention for the alignment of two separate objects at least one of which is movable with respect to the other includes a flexible line connectible between desired points on the objects, and means mounted on the first object for drawing in the line as the first object moves toward the second. A sensing means is provided for detecting changes in the alignment of the desired points, resulting from movement of the first object, and an indicating means is provided for signalling such changes to the operator whereby alignment may be determined and maintained during movement of said first object toward said second object.

The device is particularly useful between a towing vehicle and a towed vehicle such as house trailer. When adapted for such vehicles, the device may further include means for indicating the operability of electrical systems on board one or both of the vehicles. Such means provides the operator the additional advantage of being able to check the operability of clearance lamps, brake lights, turn signals, auxiliary systems such as electrically activated brakes and the like, by himself either during movement of the vehicles or whenever they are at rest.

Preferred embodiments of the subject guidance device are shown and described by way of example in the accompanying drawings and description without attempting to show all of the various forms and modifications in which the present invention might be embodied; the invention being measured by the appended claims and not by the details of the specification.

DETAILED DESCRIPTION
OF THE PREFERRED EMBODIMENTS

Figure 1:
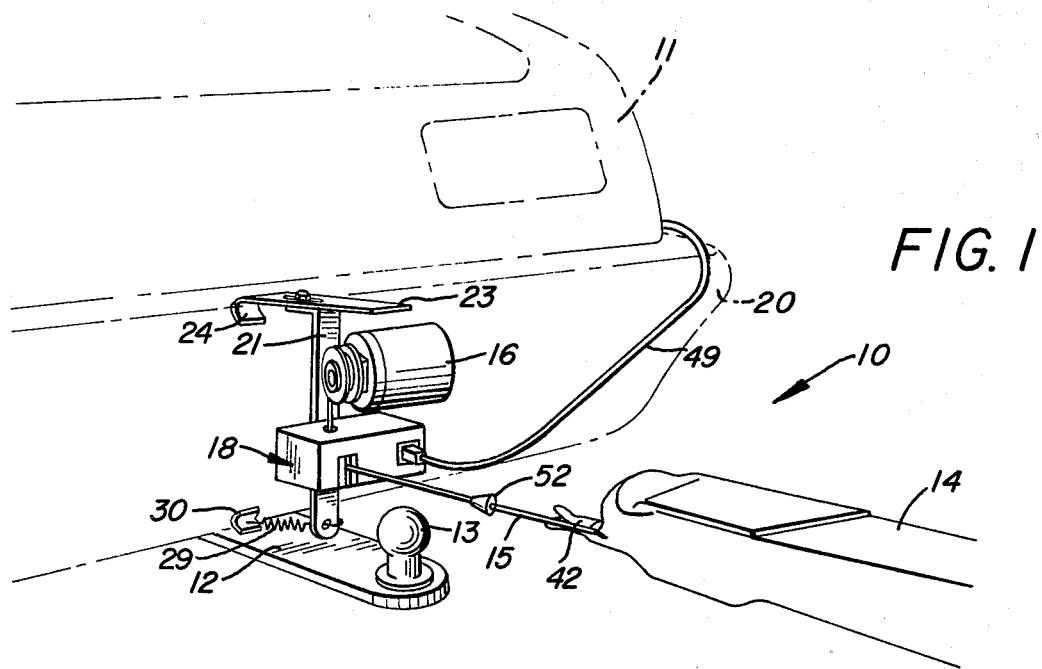
FIG. 1 is a perspective view of a portion of the device mounted over the hitch ball of a towing vehicle, depicted in phantom, and including the flexible line connected to the tongue of a towed vehicle, means for drawing in the line and the sensing means.
Figure 3:
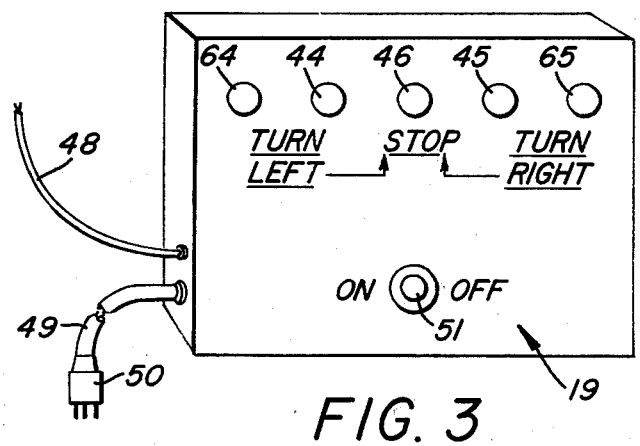
FIG. 3 is a perspective view of the remaining portion of the device depicting the indicator means for signalling changes in alignment between two objects or vehicles.

The device, indicated generally by the numeral 10, is depicted in FIG. 1 for use with a towing vehicle, such as a car 11, having a tow bar and hitch ball, 12 and 13, respectively, and a towed vehicle such as a house trailer, camper, boat, commercial trailer or the like, having a draw bar 14. Alternatively, the device could be utilized with a boat and a slip at a dock or with a truck at a loading dock. The device 10 includes a flexible line 15, connectible between the two vehicles, means mounted on one of the vehicles, such as the motor 16, to draw in the line 15 as the car 11 moves toward the draw bar 14, sensing means for detecting changes in the alignment of the two vehicles, indicated generally by the numeral 18, and indicating means for signalling such changes to the driver of the car 11, hereinafter referred to as the indicator panel 19.

Figure 2:
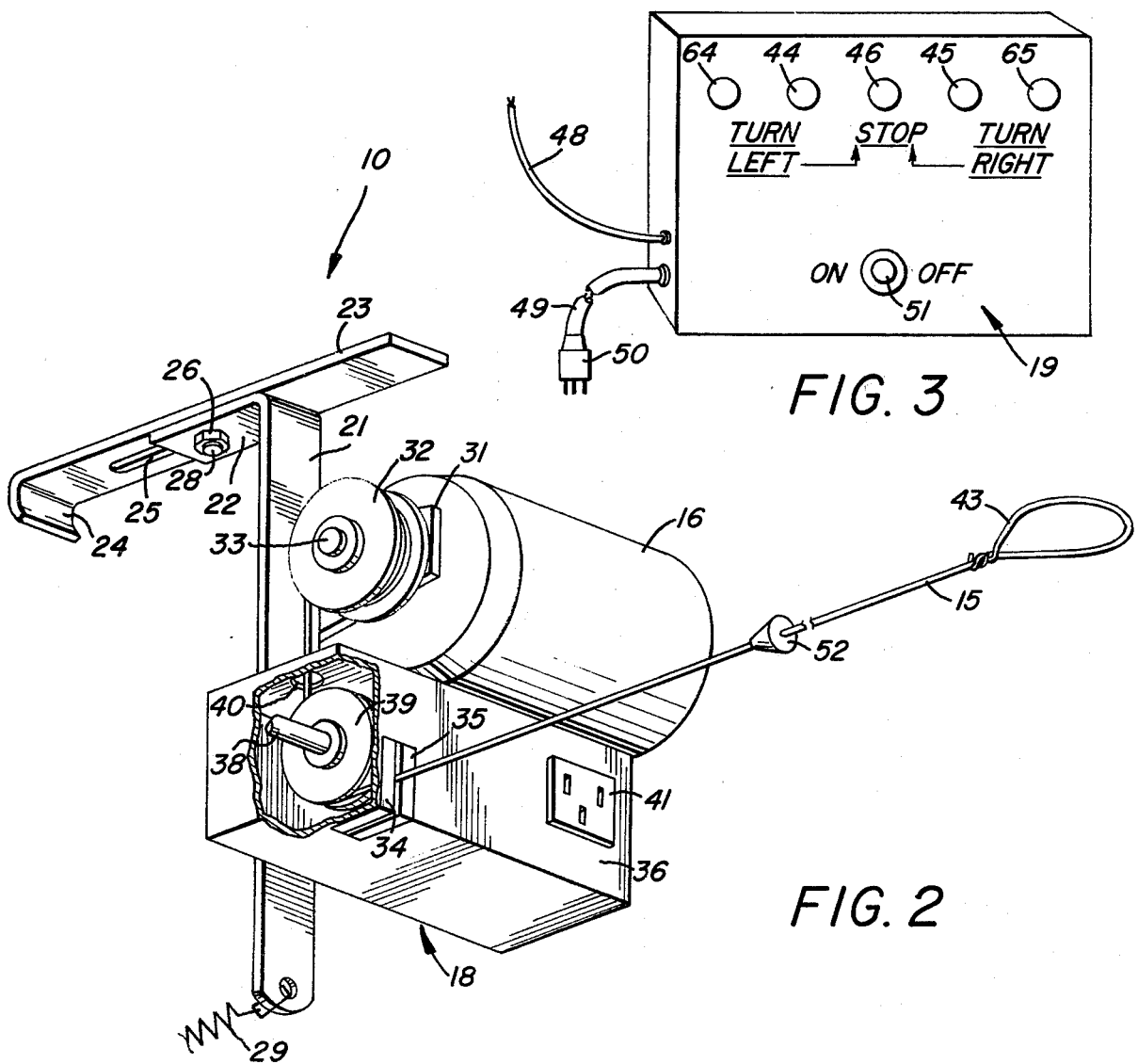
FIG. 2 is an enlarged perspective view of the device depicted in FIG. 1, a portion of which has been partially broken away.

Referring specifically to FIGS. 1 and 2, it is seen that the device 10 may be mounted on the bumper 20 of the vehicle 11 directly over the hitch ball 13. To facilitate such mounting, a vertical bracket 21 having a horizontally extending leg 22 at its upper end is connected to a horizontal bracket 23 having a bumper engaging lip 24 at one end. In order to accommodate various bumpers, the bracket 23 has a longitudinally extending slot 25 therein and is adjustably fastened to the bracket 21 via nut and bolt combination 26 and 28. An extension spring 29 is connected to the lower end of the bracket 21 and is provided with a bumper engaging clip 30.

The motor 16 which draws in the flexible line 15 may be conveniently affixed to the bracket 21 by a plate 31 mounted thereon, or in any other suitable manner. The motor 16 is preferably electric, operating on 12 volts D.C. or less, or, it may be a mechanical spring wound device. A small pulley 32 is mounted on the output shaft 33 of the motor 16 to wind in the flexible line 15 as it is drawn. As will be more fully understood hereinbelow, the motor 16 need not develop any appreciable torque which will permit it to be readily stalled without damage to itself or any of the other components of the device 10.

The sensing means 18 for detecting changes in the alignment of the two vehicles consists of two L-shaped strips of conductive metal 34 and 35 mounted at the bottom portion of a box or frame 36, or other suitable enclosure, carried by the bracket 21. A shaft 38 is mounted within the box 36 and is provided with a pulley 39. As is seen in FIG. 2, the flexible line 15 extends downwardly from the pulley 32, through an aperture 40 in the box 36, and is guided around the pulley 39 and between the metal strips 34 and 35, the space therebetween being somewhat wider than the diameter of the line 15. The box 36 may also be provided with a receptacle 41 for detachably supplying current to the motor 16 and sensing means 18.

The flexible line 15 is preferably a conductive material and it has been found that a braided steel cable having a length of 20 to 30 feet is quite suitable. As already indicated, one end of the line 15 is affixed to the pulley 32. The opposite end of the line may carry a spring clip 42 or a loop 43 for temporary contact with the drawbar 14 of a trailer.

The indicator panel 19 consists of a box having signal means such as a buzzer, light-emitting diodes or light bulbs, e.g., a bulb 44 on the left side, a bulb 45 on the right side and a bulb 46 in the center of the device. The bulbs 44 and 45 may be red and the bulb 46 green. In addition, the words TURN LEFT, STOP and TURN RIGHT may be provided to aid the driver. Current is fed into the panel 19 via wire 48, which is conveniently provided with a plug (not shown) to engage the socket of a cigar lighter, and through the remainder of the device 10, via cord 49 having a plug 50 to engage the receptacle 41. A separate switch 51 may also be employed to activate the device 10 as desired.

The device 10 is wired so that the motor 16 and bulb 46 are activated when current is flowing through the switch 51, the motor 16 being grounded through the bracket 21 so that the flexible cable 15 is also grounded. The bulb 44 is wired in series with the metal strip 34 of the sensing means and carries a positive charge. Similarly, the bulb 45 is wired in series with the metal strip 35 of the sensing means and also carries a positive charge.

To use the device 10, the bracket 21 is positioned on the bumper 20 so that the metal strips 34 and 35 are in direct alignment with the hitch ball 13. Alternatively, the bracket 21 could be modified so as to engage the tailgate of a station wagon or for permanent mountng inside the trunk of the vehicle 11, or it could even be magnetic. The vehicle 11 should then be positioned to at least within 20 or 30 feet from the trailer. The flexible line 15 is then pulled away from the device 10 and is affixed to the drawbar 14 in such a manner that the line 15 is aligned with the socket thereof. Next, the indicator panel 19 is placed upon the dashboard or the floor of the vehicle 11 in full view of the driver, the wire 48 is plugged into the lighter socket, the plug 50 is connected to the receptacle 41 and the switch 51 is moved to the ON position.

At this point at least the green bulb 46 should be illuminated and the motor 16 should be running to draw in any slack in the line 15 so as to maintain it taut between the two vehicles. As the driver commences rearward movement of the vehicle 11, the motor 16 will continue to draw in the slack; however, if the vehicle 11 is misaligned with the trailer, e.g., too far to the right, the line 15 will contact the metal strip 34, closing the circuit to the bulb 44 thereby indicating to the driver that the vehicle 11 should be turned to the left until the bulb 44 goes out. Similarly, movement too far to the left will illuminate bulb 45 indicating that corrective steering should be made to the right. True, aligned rearward movement of the vehicle 11 will be indicated when neither bulb 44 nor 45 is on, inasmuch as the pulley 39 guides the line 15 exactly between the metal strips 34 and 35.

When the vehicle 11 is within several inches from the drawbar 14, a stop 52, carried by the line 15 and made from a conductible material, contacts both strips 34 and 35 simultaneously, causing illumination of both bulbs 44 and 45, thereby indicating to the driver that he is in position and should stop. The stop 52 may be adjustably positioned on the line 15 so as to vary the final distance between the vehicle 11 and the trailer.

As mentioned hereinabove, the motor 16 need not be very powerful, and in fact, the current may even be reduced with a resistor to insure that the motor can stall in the event the switch 51 is left on when the vehicle 11 is not moving or is moving slower than the line 15 is being drawn. It is intended that the motor 16 would stall before the line 15 was pulled loose from the drawbar 14 or damage was done to any other components of the device 10, or to either vehicle. Of course, a clutch mechanism (not shown) could also be employed if desired, but with an attendant increase in the cost of the overall device 10. It is to be understood that a spring wound motor or equivalent device could be substituted in lieu of the electric motor 16 so long as the line 15 remains grounded to complete the circuit with the metal strips 34 and 35.

It should furthermore be understood that the device 10 could be employed to guide the vehicle 11 with attached trailer into a parking space such as a campsite, by mounting the bracket 21 on the rear of the trailer and extending the line 15 to a nearby fixed object in axial alignment with the trailer. In such an instance the indicator panel 19 could be inverted so that the bulbs 44 and 45 would again indicate the correct direction of steering as may be necessary. If desired, the indicator panel could also be positioned behind the driver so that he could observe it as well as the direction in which he is moving, simultaneously.

Figure 4:
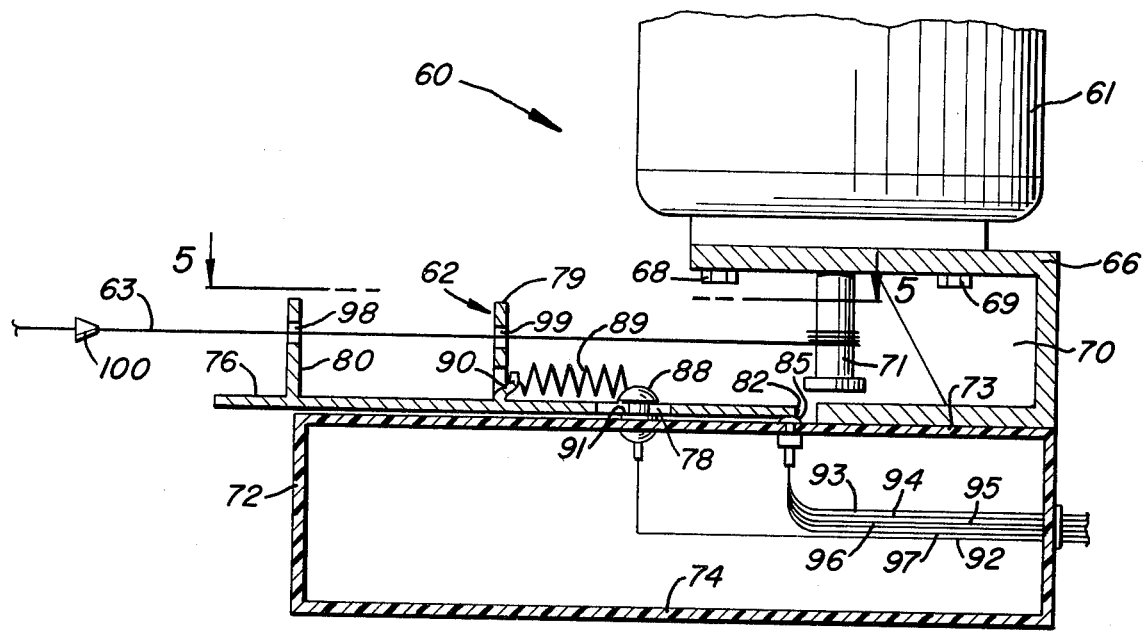
FIG. 4 is a top plan view, partially in section, of an alternate embodiment of a portion of the device including the flexible line, means for drawing in the line and the sensing means.
Figure 5:
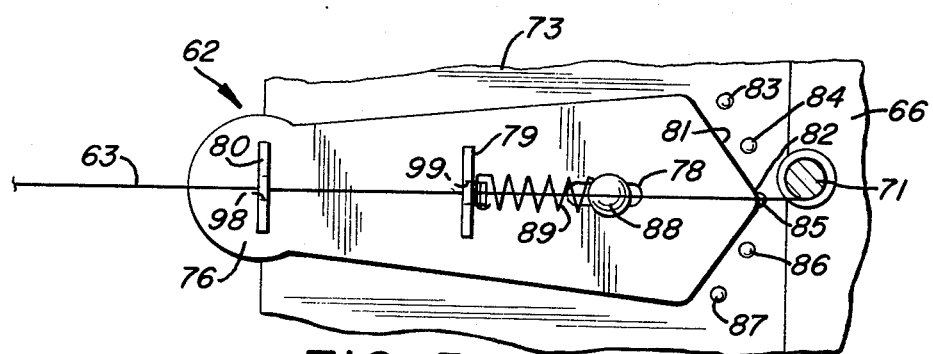
FIG. 5 is an enlarged plan view, taken substantially along line 5—5 of FIG. 4 and depicting the structure of the sensing means; and, FIG. 6 is a perspective view of an alternate embodiment of the indicator means for signalling changes in alignment and further depicting means for signalling the operability of electrical systems on board the towing and towed vehicles.

Referring now to FIGS. 4 and 5, an alternative embodiment of the device, indicated generally by the numeral 60, shall be described. The operation of the device 60 has been somewhat modified from the device 10 so as to indicate to the driver, in varying degrees, the amount of steering correction required in addition to the direction. The device 60 employs a motor 61, a variable sensing means, indicated generally by the numeral 62, a flexible line 63 and an indicator panel, such as panel 19, but having two additional bulbs 64 and 65.

The motor 61 is affixed to a bracket 66 with bolts 68 and 69 and it may be suitably adapted for mounting to the vehicle. An angle plate 70 may be employed to strengthen the bracket 66. The motor 61 has a drive shaft 71 upon which the flexible line 63 may be attached, or a pulley (not shown) may be mounted thereon. Also carried by the bracket 66, adjacent the end of shaft 71, is a frame 72 having an upper and lower surface, 73 and 74, respectively, for mounting the sensing means 62 in operative position and to carry a receptacle (not shown) for readily connecting wires from the indicator panel 19.

The sensing means 62 includes a movable switching element 76 having an oval slot 78 located in approximately the first third of its length, and two perpendicularly extending gates 79 and 80 located along the remainder of its length. The forward edge 81 of the switching element 76 terminates in a point 82 for contact with any one of five arcuately oriented contact points 83–87 which are mounted in the upper surface 73 of the frame 72. Passing through the slot 78, in switching element 76, and the frame 72, is a rivet 88 or other suitable fastening device which mounts the element 76 on the frame 72 for pivotal and reciprocal movement thereon. A small compression spring 89 is held between the rivet 88 and a short tang 90, extending from one of the gates 79. A small washer 91, may be employed as a spacer between the element 76 and frame 72.

The switching element 76 is preferably constructed of a conductive metal, in order to complete a circuit through any of the contact points 83–87, while the frame 72 is constructed of a plastic or other suitable non-conductive material. Alternatively, the element 76 could be formed from a plastic material the forward edge 81 of which would carry a metallic insert for contact with the points 83–87.

When the element 76 is metallic, current may be readily passed therethrough by connecting one side of a battery power source to the rivet 88 via wire 92. Each of the contact points 83–87 would then be connected to the other side of the battery via wires 93–97 which are connected in series with the bulbs on the indicator panel, e.g., point 83 to bulb 64 via wire 93; point 84 to bulb 44 via wire 94; point 85 to bulb 46 via wire 95; point 86 to bulb 45 via wire 96; and point 87 to bulb 65 via wire 97.

The flexible line 63 may be any material, preferably one which is fairly strong, lightweight and of a small diameter such as a nylon monofilament. The line 63 is passed through apertures 98 and 99, in gates 80 and 79, respectively, and is connected directly to the motor output shaft 71 or a suitable pulley (not shown). An adjustable stop 100 is carried by the line 63 serving a function similar to the stop 52 on line 15.

In operation, the device 60 is mounted on the vehicle and connected to the trailer or other object in a manner similar to that described in conjunction with the device 10. When the switch 51 is activated, the motor 61 operates to draw the slack from the line 63 and at least one of the bulbs 44–46, 64 or 65, will be illuminated inasmuch as the point 82 of the switching element 76 will touch one of the contact points 83–87. As the vehicle moves rearwardly, in correct alignment with the trailer, the line 63, passing through apertures 98 and 99, will orient the switching element 76 so that the point 82 is touching the contact point 85, illuminating the bulb 46. In the event the vehicle moves into misalignment with the trailer, e.g., to the left, the line 63 will contact the gates 79 and 80 causing the switching element 76 to pivot about the rivet 88 whereby the point 82 will touch either contact point 86 or 87 and, in turn, illuminate the respective bulb 45 or 65 indicating to the driver that he has moved incorrectly to the left a slight or a large amount. In either event, a proportionate amount of steering to the left will straighten the switching element point 82 into contact with the point 85 or the points 84 or 83, if oversteering is applied.

When the vehicle is within the desired distance from the trailer, the motor 61 will have drawn the line 63 in enough so that the stop 100 is urged against the gate 80. At this time the entire switching element 76 will be urged forward and the leading edge 81 thereof will contact all points 83-87, simultaneously illuminating all bulbs 44-46, 64 and 65, and indicating to the driver that he should stop.

Figure 6:
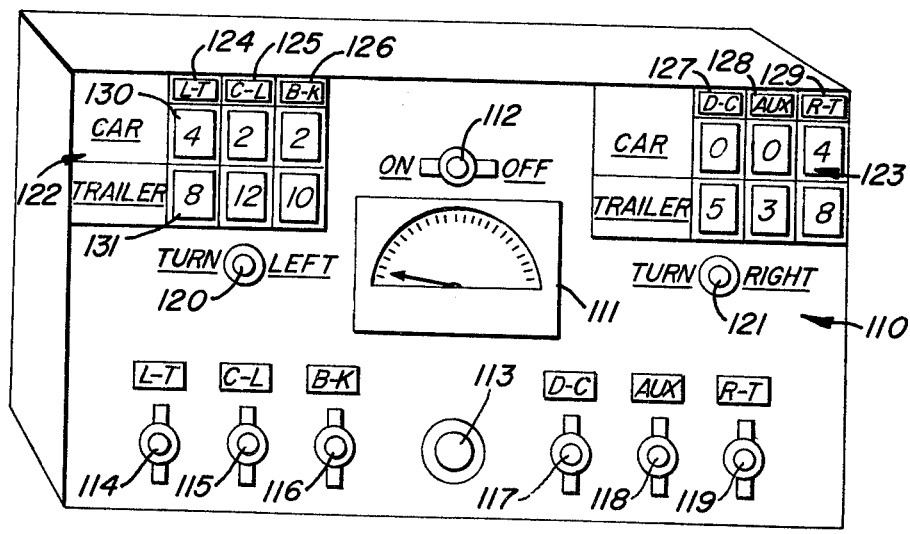

With reference now to FIG. 6, a further embodiment of indicator panel, indicated by the numeral 110, will now be described. The panel 110, is provided with means for signalling to the driver the operability of various electrical systems on board his vehicle and the trailer. The panel 110 may be temporarily or permanently mounted on or in the dashboard of the vehicle and includes a gauge such as an ammeter 111 calibrated from 0 to at least 20 amps, an ON-OFf switch 112 and accompanying lamp 113 and a plurality of double poledouble throw switches 114-119, preferably spring loaded switches which return to the OFF position at rest. Additionally, lamps 120 and 121 may be provided to indicate alignment of the vehicle with the trailer as described hereinabove.

Indicia blocks 122 and 123 may be provided on the panel 110 suitably subdivided into desired circuits for the vehicle and the trailer such as, left turn signal 124, clearance lights 125, brake control 126, D.C. auxiliary 127 and 128, and right turn signal 129. The description of the wiring of the panel 110 can be readily understood with respect to the left turn signals of the car and trailer. The ammeter 111 is connected in parallel to the circuit of the left turn signal lamps of the car and in series with one side of the switch 114 and in parallel to the circuit of the left turn signal lamps of the trailer and in series with the other side of the switch 114.

The amount of current flowing through the left turn signal system of the car may be observed, for the first time, directly from the ammeter 111 or, it may be obtained from a specification manual. Assuming the proper amount or standard is 4 amps, the numeral 4 would be placed in a square 130 directly below the subdivision 124 for left turn signals. In like manner, the correct amperage for the car and trailer left turn signal circuitry, or for the trailer alone if so desired, e.g., 8, will be placed in a square 131. The numerals may be printed on metal or plastic squares having a pressure sensitive adhesive on the rear side or, they may be indicated in the blocks 122 and 123 in any other suitable manner.

When the panel 110 is completely connected and all standard amperages recorded, the driver may readily check the operability of the various electrical components merely by pushing the corresponding switch and comparing the instantaneous ammeter reading with the standard, printed reading appearing on the panel 110, a higher reading, for instance, would indicate a decrease in resistance and hence, a burned out bulb. It is to be understood that the selection of six switches 114-119, as well as the corresponding number of particular electrical systems 124-129 named herein and the suggested ammeter readinigs are merely set forth for the purpose of illustration and therefore, one skilled in the art may be expected to select various other components for checking, without departing from the scope of the invention.

Thus, it should be evident that the devices disclosed herein carry out the objects of the invention set forth above. As apparent to those skilled in the art, modifications can be readily facilitated by combinations of the various components described herein, such as the sensing means 18 and 62 or the indicator panels 19 and 110, or by mounting the device 10 or 60 on various objects in whatever manner may be most expeditious, without departing from the spirit of the invention herein disclosed and described, the scope of the invention being limited solely by the scope of the attached claims.

I claim:

1. A guidance device activated by a power source to aid an operator in the alignment of a first and a second object at least one of which is movable with respect to the other comprising:

a flexible line connectible between desired points on said first and second objects;

means mounted on said first object for drawing in said line as said first object moves toward said second object;

sensing means for detecting changes in the alignment of said desired points; and, indicating means for signalling said changes to the operator whereby alignment may be determined and maintained during movement of said first object toward said second object wherein said sensing means includes:

a frame;

a switching element in electrical contact with one pole of the power source;

means for pivotally mounting said element on said frame; and, at least three contact points carried by said frame and in electrical contact with the other pole of said power source; and, wherein said switching element includes;

an elongated slot through which a rivet passes to guide reciprocable movement of said element on said frame;

at least one gate extending outwardly from said element and having an aperture therein for the passage of said flexible line freely therethrough; and, a forward edge communicable with all of said contact points and terminating in a point communicable with any one of said contact points.

2. A guidance device, as set forth in claim 1, wherein said means for drawing in said line is an electric motor.

3. A guidance device, as set forth in claim 1, wherein said sensing means further comprises:

biasing means interposed between said gate and said means for pivotally mounting said element urging said forward edge away from said contact points.

4. A guidance device, as set forth in claim 1, further including:

a stop element movable along said flexible line the size of said stop element being greater than said aperture in said gate.

5. A guidance device, as set forth in claim 1, wherein said device is operated by a power supply and said indicating means comprises:

a panel having at least two signal means in electrical contact with said sensing means and one pole of said power source.

6. A guidance device, as set forth in claim 1, wherein said indicating means comprises:

a panel having at least three signal means in electrical contact with said contact points.

* * * * *